US009262242B2

(12) United States Patent
Stansell et al.

(10) Patent No.: US 9,262,242 B2
(45) Date of Patent: Feb. 16, 2016

(54) MACHINE-TO-MACHINE ("M2M") DEVICE CLIENT SYSTEMS, METHODS, AND INTERFACES

(71) Applicant: Verizon Patent and Licensing Inc., Arlington, VA (US)

(72) Inventors: Robert Bruce Stansell, Winston Salem, NC (US); Paul Jeffrey Silver, San Diego, CA (US); Daryl Nebrich, Concord, NC (US); David Geltner, Naperville, IL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 479 days.

(21) Appl. No.: 13/732,086

(22) Filed: Dec. 31, 2012

(65) Prior Publication Data

US 2014/0189075 A1    Jul. 3, 2014

(51) Int. Cl.
| | |
|---|---|
| G06F 15/177 | (2006.01) |
| H04W 4/00 | (2009.01) |
| G06F 9/54 | (2006.01) |
| G06F 15/173 | (2006.01) |
| G06F 15/16 | (2006.01) |
| H04B 7/00 | (2006.01) |
| H04L 12/24 | (2006.01) |

(52) U.S. Cl.
CPC ............... *G06F 9/546* (2013.01); *H04W 4/003* (2013.01); *H04W 4/005* (2013.01); *H04L 41/0853* (2013.01); *H04W 4/001* (2013.01)

(58) Field of Classification Search
CPC . H04L 41/0803; H04L 41/0853; G06F 9/546; H04W 4/005; H04W 4/003; H04W 4/001
USPC .......... 709/203, 220, 223, 227, 230; 370/310; 455/426.1
See application file for complete search history.

(56) References Cited

U.S. PATENT DOCUMENTS

| | | | | |
|---|---|---|---|---|
| 8,316,438 | B1* | 11/2012 | Bush ....................... | H04L 12/66 726/22 |
| 8,761,101 | B1* | 6/2014 | Crosbie ................. | H04W 4/005 370/230 |
| 8,989,091 | B2* | 3/2015 | Muhanna ............... | H04W 4/005 370/328 |
| 2007/0093243 | A1* | 4/2007 | Kapadekar ........ | H04M 3/42178 455/419 |
| 2008/0049779 | A1* | 2/2008 | Hopmann ........... | H04L 12/2807 370/431 |
| 2008/0052384 | A1* | 2/2008 | Marl .................... | H04L 12/2807 709/223 |
| 2008/0168440 | A1* | 7/2008 | Regnier ................. | H04L 67/02 718/100 |
| 2011/0200052 | A1* | 8/2011 | Mungo ................. | H04L 41/028 370/401 |

(Continued)

OTHER PUBLICATIONS

European Telecommunications Standards Institute (ETSI), Machine-to-Machine communications (M2M); M2M service requirements, ETSI TS 102 689 V1.1.1 (Aug. 2010) Technical Specification, France, (Aug. 2010).

*Primary Examiner* — Vitali Korobov

(57) ABSTRACT

Exemplary machine-to-machine ("M2M") device client systems, methods, and interfaces are described herein. An exemplary M2M device includes an M2M device client configured to provide 1) a platform messaging interface through which the M2M device client communicates with an M2M platform and 2) an application interface that includes a set of application program interfaces ("APIs") through which an application installed on the M2M device interfaces with the M2M device client. The set of APIs may include one or more of the exemplary APIs and/or API function calls described herein. Corresponding systems, methods, and interfaces are also described.

21 Claims, 13 Drawing Sheets

(56) References Cited

U.S. PATENT DOCUMENTS

| | | | |
|---|---|---|---|
| 2013/0017827 A1* | 1/2013 | Muhanna | H04W 4/005 455/426.1 |
| 2014/0126581 A1* | 5/2014 | Wang | H04W 4/001 370/431 |
| 2014/0143395 A1* | 5/2014 | Geltner | H04L 41/0893 709/223 |

* cited by examiner

MACHINE-TO-MACHINE ("M2M") DEVICE CLIENT SYSTEMS, METHODS, AND INTERFACES

BACKGROUND INFORMATION

Machine-to-machine ("M2M") technology is a growing industry designed to communicatively connect machines to one another. An M2M solutions provider uses M2M technology to provide an M2M solution to a customer. For example, an M2M solutions provider may provide a customer such as a trucking company with an M2M solution that communicatively connects the trucking company's fleet of trucks to a company computing system (e.g., a personal or server computer operated by the trucking company). Company personnel may utilize the company computing system to monitor and/or control the fleet of trucks by way of the M2M solution.

An M2M solutions provider may provide an M2M solution over an M2M platform. Accordingly, the M2M solution may be said to be built on the M2M platform, with the M2M platform providing foundational functionality to support the M2M solution. For example, the M2M platform may provide underlying functionality that establishes communication paths and routes communications between a customer computing system and in-field customer assets as part of an M2M solution.

To this end, M2M device clients are typically deployed in the field together with in-field customer assets and configured to provide an interface between the customer assets and an M2M platform. For example, an M2M device client may be deployed on a truck included in a customer's fleet of trucks. The M2M device client may interface with the truck to receive and send data representative of operational parameters of the truck (e.g., truck location, speed, direction, fuel level, etc.) to the M2M platform. Additionally or alternatively, the M2M device client may receive and use communications provided by the M2M platform to configure the M2M device client and/or to control operations of the truck.

The configuration and/or functionality of an M2M device client dictates development of M2M devices that implement or will implement the M2M device client. For example, original equipment manufacturers ("OEMs") may manufacture M2M devices in accordance with the configuration and/or functionality of the M2M device client. As another example, computing code developers may develop M2M device applications (e.g., embedded code and/or software applications for M2M devices) in accordance with the configuration and/or functionality of the M2M device client. The configuration and/or functionality of an M2M device client may also affect M2M network usage and costs associated with the M2M network usage, which may in turn affect the costs of an M2M solution. For these and/or other reasons, an M2M device client is desired that provides robust functionality, flexible configurability, and/or efficient network usage. Moreover, an interface to the M2M device client that promotes flexible configurability and cost-effective development of M2M devices and computing code is desired.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Exemplary M2M device client systems, methods, and interfaces are described herein. As an example, an exemplary M2M device may include an M2M device client configured to provide 1) a platform messaging interface through which the M2M device client communicates with an M2M platform and 2) an application interface that includes a set of application program interfaces ("APIs") through which an application installed on the M2M device interfaces with the M2M device client. The set of APIs may include one or more of the exemplary APIs and/or API function calls described herein.

The exemplary M2M device client systems, methods, and interfaces described herein, including the exemplary set of APIs described herein, may provide robust functionality, flexible configurability, and/or efficient network usage for an M2M solution. Additionally or alternatively, the exemplary M2M device client systems, methods, and interfaces described herein, including the exemplary set of APIs described herein, may promote flexible configurability and cost-effective development of M2M devices and M2M device applications.

Exemplary M2M device client systems, methods, and interfaces will now be described in reference to the accompanying drawings.

Figure 1:
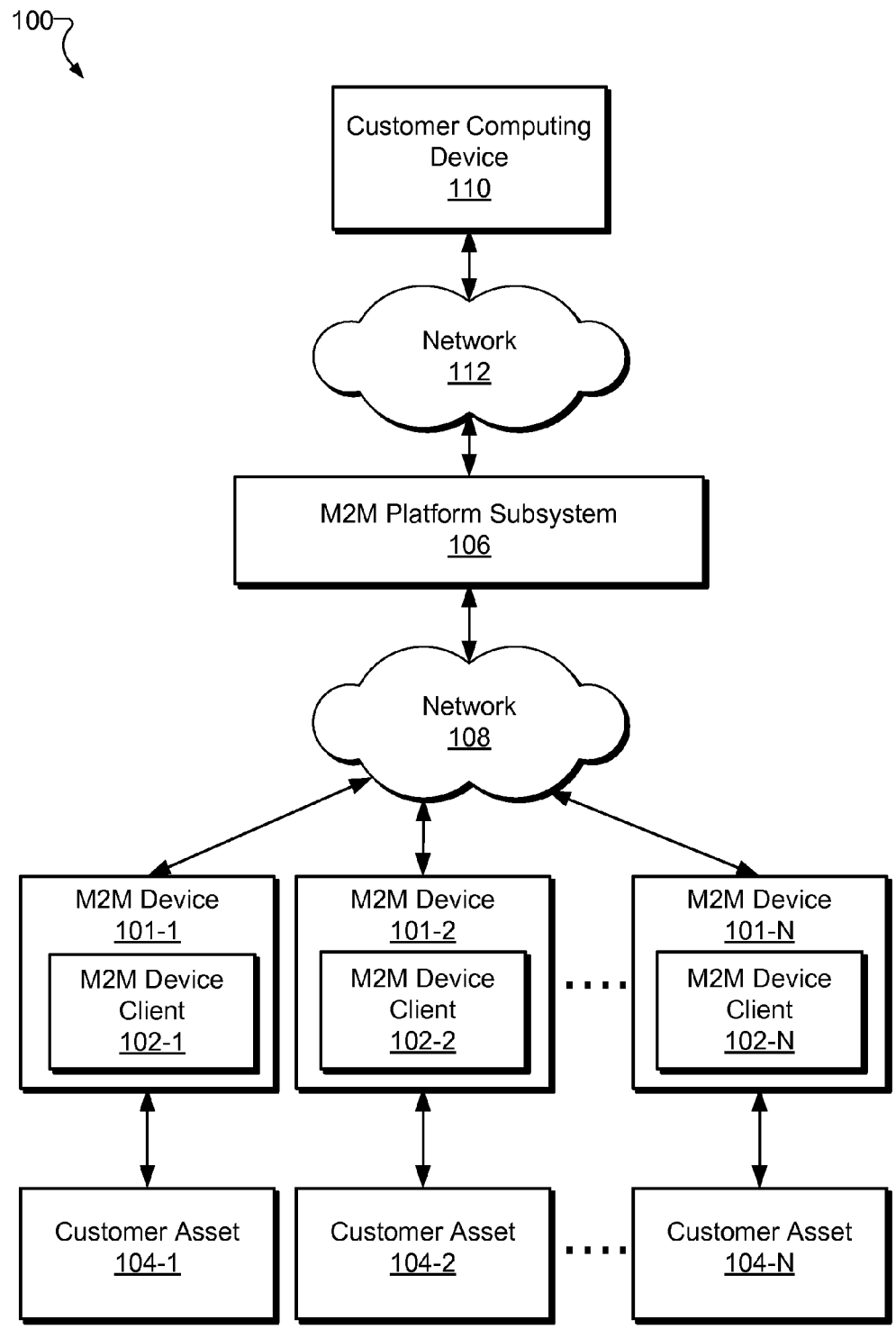
FIG. 1 illustrates an exemplary M2M system according to principles disclosed herein.

FIG. 1 illustrates an exemplary M2M system 100 ("system 100"), which may be configured to provide an M2M solution to a customer of an M2M solutions provider. As shown, system 100 may include M2M devices (e.g., M2M devices 101-1 through 101-N) implementing M2M device clients 102 (e.g., M2M device clients 102-1 through 102-N), which may be configured to provide an interface between customer assets 104 (e.g., customer assets 104-1 through 104-N) and an M2M platform provided by an M2M platform subsystem 106.

To this end, M2M device clients 102 may be configured to provide an interface to customer assets 104. Customer assets 104 may include any devices, machines, apparatuses, computing devices, sensors, computing code (e.g., applications) implemented by a computing device, and/or other assets associated with a customer of an M2M solutions provider. In certain examples, customer assets 104 may include deployed field devices (e.g., parking meters, vending machines, digital billboards, electric meters, etc.). Examples of an interface between an M2M device client 102 and customer assets 104 are described herein. Customer assets 104 may be separate from M2M devices 101 or integrated within M2M devices 101. While FIG. 1 shows each M2M device 101 communicatively coupled to one of the customer assets 104, this is illustrative only and not limiting. An M2M device 101 may be communicatively coupled to one or more customer assets 104.

M2M device clients 102 may also provide an interface to M2M platform subsystem 106, such as by sending and receiving communications to and from M2M platform subsystem 106 in accordance with one or more M2M platform communications protocols (e.g., one or more over-the-air M2M transport and/or application protocols). For example, M2M device clients 102 may send data representative of one or more parameters of customer assets 104 to M2M platform subsystem 106, receive customer asset control messages and/or M2M device client 102 management messages from M2M platform subsystem 106, and/or send or receive any other data or communication signals to or from M2M platform subsystem 106.

M2M device clients 102 and M2M platform subsystem 106 may communicate one with another using any communications technologies that are suitable for an M2M solution and/or platform. In certain examples, M2M device clients 102 may communicate with M2M platform subsystem 106 by way of a network 108. Network 108 may include one or more wireless networks, cellular networks (e.g., 2G, 3G, 4G, or long term evolution ("LTE") networks), carrier-specific networks, broadband networks, closed media networks, cable networks, satellite networks, the Internet, intranets, wide area networks, local area networks, public networks, private networks, optical fiber networks, and/or any other networks or combination of networks capable of carrying data and communications signals between M2M platform subsystem 106 and M2M device clients 102.

In certain examples, M2M device clients 102 may communicate with M2M platform subsystem 106 by way of a predefined M2M application protocol. The M2M application protocol may provide for any messaging that supports M2M communications for an M2M solution. This may include messages for adding, deleting, requesting, and transferring any data related to an M2M solution.

In certain examples, M2M device clients 102 may communicate with M2M platform subsystem 106 by way of a predefined M2M transport protocol that provides communication channels between M2M device clients 102 and M2M platform subsystem 106. M2M application protocol messages may be wrapped in the M2M transport protocol. The M2M transport protocol may include a command and acknowledgement protocol (e.g., to provide reliability), support for message caching when an M2M device client is not connected to M2M platform subsystem 106, two-way messaging, and support for various M2M device architectures (e.g., by using binary or ASCII payloads). M2M transport protocol messages may be wrapped in TCP/IP messages in certain examples.

In some implementations, all messages between M2M device clients 102 and M2M platform subsystem 106 are transmitted using the M2M application and/or transport protocols, except for certain device wakeup messages, which may be transmitted using other communication technologies such as TCP/IP or short message service ("SMS") technologies. In other implementations, one or more other messages (e.g., messages other than wakeup messages) may be transmitted using other communication technologies such as TCP/IP or SMS technologies.

M2M platform subsystem 106 may be implemented by one or more servers associated with (e.g., managed or otherwise operated by) an M2M solution and/or platform provider. The one or more servers may be located in a single data center, distributed across a plurality of data centers (e.g., disparately located data centers), and/or otherwise configured as may serve a particular implementation. M2M platform subsystem 106 may be configured to execute or otherwise provide an M2M platform and/or one or more platform services (e.g., M2M wireless network services, M2M application services, M2M device performance services, and/or other server-side functions) of an M2M platform.

M2M platform subsystem 106 may be configured to communicate with a customer computing device 110. Customer computing device 110 may include any suitable computing device (e.g., server, personal computer, mobile computing device, etc.) associated with a customer of an M2M solutions provider and configured to communicate with M2M platform subsystem 106. Customer computing device 110 may be configured to execute one or more applications configured to interact with the M2M solution. The applications may be developed by the M2M solutions provider, the customer, a system integrator commissioned by the M2M solutions provider and/or the customer, a third party, or any combination thereof.

The applications running on customer computing device 110 may allow a customer to interact with an M2M solution provided by system 100. For example, the applications may receive M2M data from M2M platform subsystem 106 and use the data to generate one or more customer user interfaces through which the customer may access the data. As another example, the applications may receive user input from the customer, and customer computing device 110 may send communications to M2M platform subsystem 160 based on the user input. For instance, customer computing device 110 may send a control command to M2M platform subsystem 106, which may receive and process the command to facilitate performance of one or more in-field operations of an M2M device client 102 and/or customer asset 104.

In this or a similar manner, an M2M solution provided by system 100 may allow a customer to monitor information about customer assets 104, the information having been received and transmitted by M2M device clients 102 to M2M platform subsystem 106 and from M2M platform subsystem 106 to customer computing device 110. Additionally or alternatively, the M2M solution provided by system 100 may allow a customer to control customer assets 104 by way of control commands received by customer computing device 110, forwarded to M2M platform subsystem 106 by customer computing device 110, and sent from M2M platform subsystem 106 to one or more M2M device clients 102.

M2M platform subsystem 106 and customer computing device 110 may communicate one with another using any communications technologies that are suitable for an M2M solution and/or platform. In certain examples, M2M platform subsystem 106 may communicate with customer computing device 110 by way of a network 112. Network 112 may include one or more wireless networks, cellular networks (e.g., 3G, 4G, or long term evolution ("LTE") networks), carrier-specific networks, broadband networks, closed media networks, cable networks, satellite networks, the Internet, intranets, wide area networks, local area networks, public networks, private networks, optical fiber networks, and/or any other networks or combination of networks capable of carrying data and communications signals between M2M platform subsystem 106 and customer computing device 110. In certain implementations, networks 108 and 112 may comprise the same network(s). In other implementations, networks 108 and 112 may comprise separate networks.

In certain implementations, system 100, or one or more elements of system 100 (e.g., M2M platform subsystem 106), may be configured to operate in any of the ways described in co-pending U.S. patent application Ser. No. 13/680,472, filed Nov. 19, 2012, and entitled "MACHINE-TO-MACHINE ("M2M") PLATFORM SYSTEMS AND METHODS" and/or co-pending U.S. patent application Ser. No. 13/680,511, filed Nov. 19, 2012, and entitled "MACHINE-TO-MACHINE RULES MANAGEMENT METHODS AND SYSTEMS." The contents of each of these applications are incorporated herein by reference in their entirety.

An M2M device client 102 may provide an interface through which an in-field M2M device and/or components of the M2M device (e.g., customer assets 104) may access an M2M platform provided by M2M platform subsystem 106. To this end, the M2M device client 102 may provide functionality for interfacing with one or more platform services provided by M2M platform subsystem 106 in any of the ways described above and/or in the aforementioned Ser. No. 13/680,472 and/or Ser. No. 13/680,511 patent applications.

The M2M device client 102 may further provide an interface through which the in-field M2M device and/or components of the M2M device may interact with the functionality of the M2M device client 102 (and consequently with the M2M platform). For example, the M2M device client 102 may provide a set of application program interfaces ("APIs") through which an application (e.g., embedded computing code or an installed software application) running on an M2M device may interact with the functionality of the M2M device client 102, such as by issuing function calls to and/or receiving function output and/or callbacks from M2M device client 102.

Figure 2:
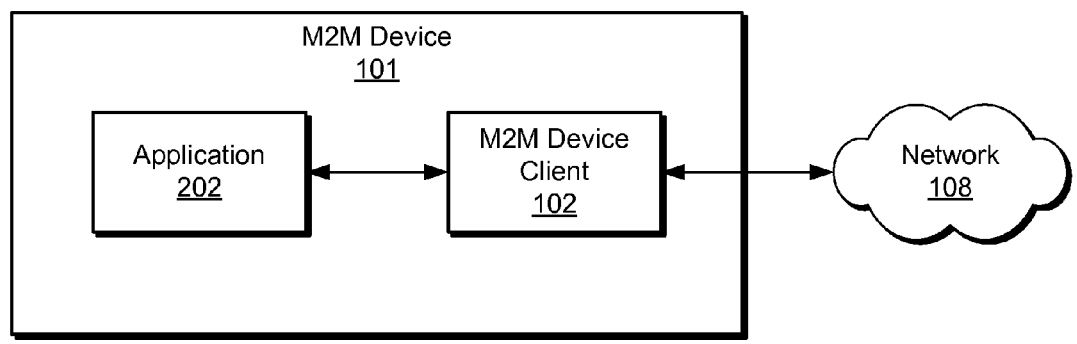
FIG. 2 illustrates an exemplary M2M device according to principles disclosed herein.

To illustrate, FIG. 2 shows an M2M device 101 that implements an M2M device client 102 and an application 202. M2M device 101 may comprise any computing device associated with a customer asset 104. For example, M2M device 101 may include a computing device that is a customer asset 104 and/or that is integrated within or otherwise connected to a customer asset 104 for in-field deployment with the customer asset 104.

M2M device client 102 may be implemented by M2M device 101 in any suitable way. For example, M2M device client 102 may include computing hardware and/or code installed in M2M device 101 and configured to perform and/or direct one or more M2M operations of the M2M device 101. Such operations may include M2M device client 102 providing an interface to M2M platform subsystem 106, such as by sending and receiving M2M communications to and from M2M platform subsystem 106 by way of network 108. Such operations may also include providing an interface to application 202, such as by exposing a set of APIs to application 202 to allow the application 202 to interact with the M2M device client 102 (e.g., access functionality of the M2M device client 102) by way of the interface. Such operations may also include performing one or more on-device operations to facilitate interaction between application 202 and M2M platform subsystem 106 and/or ultimately client computing device 110 as part of an M2M solution.

Application 202 may include computing code implemented by M2M device 101 and configured to interact with the M2M device client 102 through the interface provided by the M2M device client 102. For example, application 202 may include embedded code and/or an installed software application developed by a customer of the M2M solution, an M2M solutions provider, or a third party such as an OEM that manufactured M2M device 101. In some examples, application 202 may be developed based at least in part on a software development kit ("SDK") provided by an M2M solution and/or platform provider. The SDK may include reference computing code and/or specifications for use by the developer to develop application 202 to interface with M2M device client 102.

Application 202 may be configured to perform one or more functions that leverage the M2M device client 102 and/or M2M platform services provided by M2M platform subsystem 106. For example, application 202 may be configured to collect parameter data from one or more sensors, which sensors may be components of M2M device 101 and/or customer assets 104. Application 202 may be further configured to provide the collected data to M2M device client 102 for reporting to M2M platform subsystem 106. As another example, application 202 may be configured to control operations of one or more components of M2M device 101 and/or customer assets 104 based on control commands received from the M2M device client 102.

Figure 3:
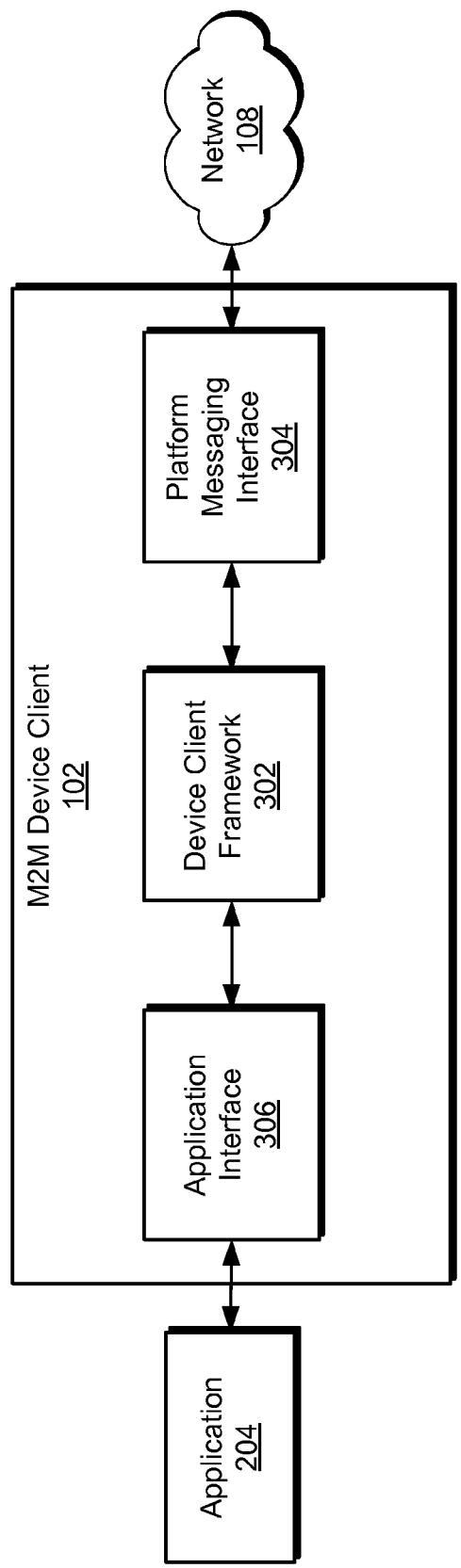
FIG. 3 illustrates an exemplary M2M device client according to principles disclosed herein.

FIG. 3 shows that M2M device client 102 may include a device client framework 302 ("DCF 302") that provides a platform messaging interface 304 for interfacing with M2M platform subsystem 106 by way of network 108 and an application interface 306 for interfacing with application 202. DCF 302 may also provide functionality related to an M2M solution and/or platform. The inclusion of such functionality on M2M device 101 may help reduce M2M traffic on network 108, which may help to reduce or otherwise control costs of an M2M solution. The illustrated elements of M2M device client 102 will now be described in more detail.

Figure 4:
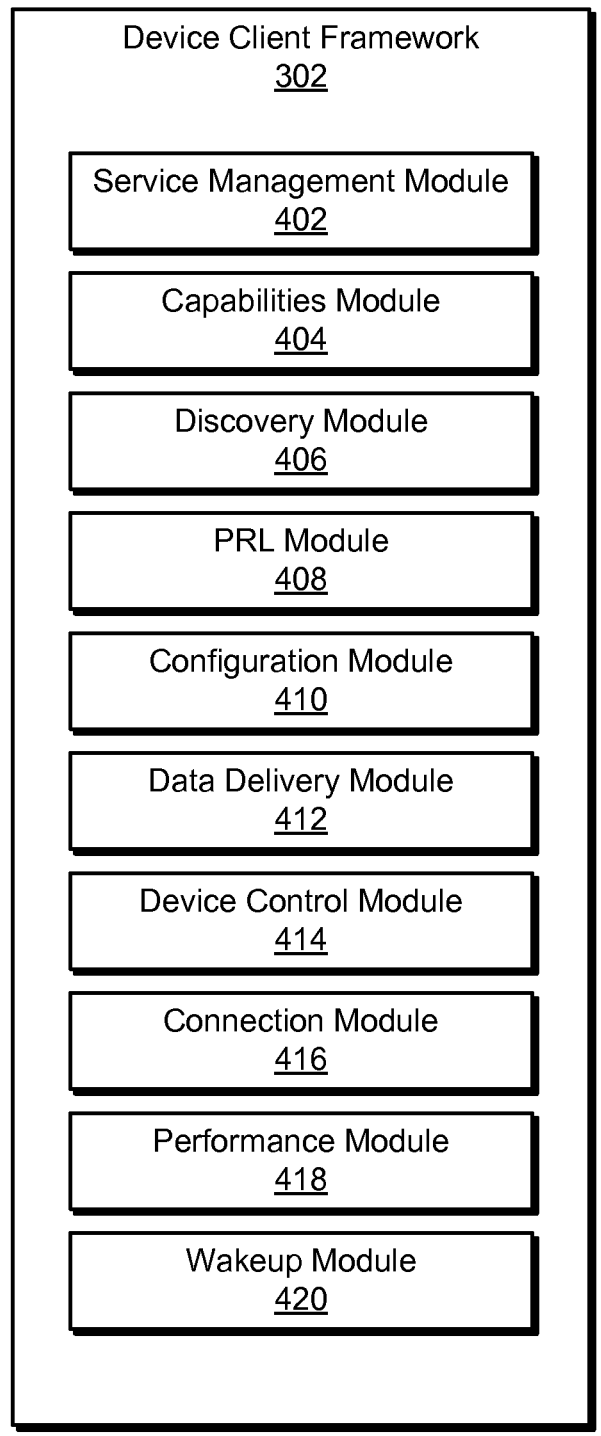
FIG. 4 illustrates an exemplary device client framework of the M2M device client of FIG. 3 according to principles disclosed herein.

FIG. 4 illustrates exemplary components of DCF 302. As shown, DCF 302 may include a set of DCF service modules that includes a service management module 402, a capabilities module 404, a discovery module 406, a preferred roaming list ("PRL") module 408, a configuration module 410, a data delivery module 412, a device control module 414, a connection module 416, a performance module 418, and a wakeup module 420. Any of the DCF service modules may communicate one with another in any suitable way.

The particular set of DCF service modules shown in FIG. 4 is illustrative only. Other implementations may include alternative sets of DCF service modules. For example, one or more of the DCF service modules shown in FIG. 4 may be omitted from other implementations.

Each of the DCF service modules may be configured to perform one or more M2M device client operations, which operations may provide access to one or more platform services provided by M2M platform subsystem 106. Accordingly, the DCF service modules may also be referred to as M2M platform service enablers.

Service management module 402 may be configured to control (e.g., start and stop) an overall service provided by DCF 302. In certain examples, the overall service must be started and operating in order for any other operations of DCF 302 to be accessed and/or provided. To this end, service management module 402 may be configured to start and stop other DCF service modules.

Service management module 402 may be configured to perform one or more operations to roll back from DCF 302 operating in the application mode to operating in the discovery mode. The rollback may include service management module 402 notifying application 202 that a rollback has been requested. In accordance with DCF specifications, application 202 may be configured to respond to the notification by issuing a call to service management module 402 to stop the overall service, waiting for the service to be stopped by service management module 402, issuing a call to service management module 402 to start the overall service, and waiting for the service to be started by service management module 402. In some examples, application 202 may then initiate a discovery process to facilitate a discovery of M2M device 101 by M2M platform subsystem 106. In other examples, service management module 402 may exit the application mode and automatically initiate execution of a discovery process after exiting the application mode. Examples of a discovery process, discovery mode, and application mode are described herein.

In certain examples, service management module 402 may perform one or more operations to restart DCF 302. This may include service management module 402 notifying application 202 that a restart has been requested or is needed, stopping the overall service provided by DCF 302, and restarting the overall service provided by DCF 302. In accordance with DCF specifications, application 202 may be configured to respond to the notification by issuing a call to service management module 402 to stop the overall service, performing any cleanup, waiting for the service to be stopped by service management module 402, issuing a call to service management module 402 to start the overall service, and waiting for the service to be started by service management module 402.

In certain examples, service management module 402 may perform one or more operations to facilitate a reboot of M2M device 101. This may include notifying application 202 that a device reboot has been requested or is needed, and stopping the overall service provided by DCF 302. In accordance with DCF specifications, application 202 may be configured to respond to the notification by issuing a call to service management module 402 to stop the overall service, performing any cleanup, and initiating a device reboot (e.g., using OEM-specific APIs).

M2M device 101 should be configured to provide interfaces through which service management module 402 may request and receive a device identifier (e.g., an electronic serial number ("ESN"), mobile equipment identifier ("MEID"), international mobile equipment identifier ("IMEI"), or other device identifier) and other device information such as a device manufacturer, model, operating system, operating system version, and machine or hardware type.

Capabilities module 404 may be configured to get and report device capabilities, which may include features supported by M2M device 101 (e.g., features provided and/or supported by application 202). A set of capabilities for M2M device 101 may be defined by an M2M solution provider, an M2M platform provider, a customer of an M2M solution and/or platform provider, an OEM of M2M device 101, another entity, or any combination thereof. In certain examples, the set of capabilities may include standard capabilities (e.g., capabilities defined by the particular service modules implemented by DCF 302) and optional custom capabilities (e.g., custom capabilities defined by an M2M solution provider, a customer of the M2M solution provider, and/or a device OEM). Capabilities module 404 may get information about the capabilities from any suitable source, such as from service management module 402 and/or from components of M2M device 101.

Capabilities module 404 may also be configured to set device capabilities, which may include defining data that represents the set of capabilities of M2M device 101. In certain examples, capabilities module 404 may be configured to set the custom capabilities of M2M device 101. The capabilities may be represented in any suitable way, such as with key value pairs ("KVPs").

Examples of standard capabilities of an M2M device include, without limitation, a type of device, a device version, a compression type supported by the device, types of wakeup messages supported by the device (e.g., Internet Protocol ("IP") wakeup messages and/or Short Messaging Service ("SMS") wakeup messages), an ability to kill a data connection for a specified length of time, types of configuration objects supported by the device (e.g., KVP, data elements, schedules, schedule groups, threshold structures, plug-in interface definitions, and plug-in binaries), an ability to support a PRL update device control request, a type or reboot and/or reset message supported by the device, support for a diagnostics message, support for device performance diagnostics events, and support for data delivery by the M2M device. Examples of custom capabilities of an M2M device include, without limitation, a valve control capability (e.g., indicating that application 202 can open and close a customer asset valve), a thermostat control (e.g., indicating that application 202 can set a customer asset thermostat), an ignition cutoff control (e.g., indicating that application 202 can disable an ignition of a customer asset such as a vehicle), a communication capability of an M2M device (e.g., an 802.11 router, a Zigbee mesh network, etc.), and a payment collection capability of an M2M device (e.g., an attached payment device).

Discovery module 406 may be configured to perform a discovery process to facilitate a discovery of M2M device 101 by M2M platform subsystem 106. The discovery process may include discovery module 406 reporting the capabilities of and/or platform services supported by M2M device 101 to M2M platform subsystem 106. The discovery process may also include discovery module 406 communicating with M2M platform subsystem 106 to provision M2M device 101 with a unique identifier ("unique ID"). Discovery module 406 may acquire the unique ID from M2M platform subsystem 106. The discovery process may also include discovery module 406 communicating with M2M platform subsystem 106 to provision M2M device 101 with a customer identifier ("customer ID") that may be used to identify the customer associated with M2M device 101. In some examples, the discovery process may include or be followed by delivery of computing code (e.g., software) to M2M device 101. The computing code may be delivered to M2M device 101 in any suitable way and/or format. For example, the computing code may include a computing code implementation of DCF 302, an operating system image that an OEM may package with DCF 302, or application 204 or other application configured to interface with DCF 302. Such delivery of computing code may require validation of M2M device 101.

Before discovery module 406 completes the discovery process, M2M device 101 may operate in discovery mode. During operation in the discovery mode, a modem identifier (e.g., an ESN, a MEID, etc.) may be used to identify M2M device 101 to M2M platform subsystem 106, and all messages are routed to a discovery platform service provided by M2M platform subsystem 106.

After M2M device 101 completes the discovery process and acquires and starts using a unique ID as described above, the M2M device 101 operates in an application mode. During operation in the application mode, the unique ID may be used to identify M2M device 101 to M2M platform subsystem 106. This may enable M2M device 101 to communicate with and leverage other M2M platform services (i.e., services other than the discovery service) provided by M2M platform subsystem 106.

Discovery module 406 may also be configured to get and report a discovery status, which may include discovery module 406 determining one or more parameters of discovery module 406 and generating and providing an indication of the discovery status of M2M device 101 based on the parameters.

PRL module 408 may be specific to certain types of M2M devices and may be configured to perform an activation process to activate an M2M device such as M2M device 101 to access network 108 and establish a data connection with M2M platform subsystem 106. The activation process may provide M2M device 101 with a mobile directory number ("MDN"), a preferred roaming list ("PRL"), and/or other information. In alternative implementations, activation of the M2M device may be omitted from PRL module 408 and performed automatically by DCF 302 (e.g., on power-up of the M2M device). The PRL may control network selection (e.g., cellular tower selection) by M2M device 101.

PRL module 408 may be configured to update the PRL of M2M device 101. The update may be performed in any suitable way, such as by PRL module 408 initiating a voice call to network 108. The update may be performed periodically and/or in response to a predetermined event (e.g., in response to a request from M2M platform subsystem 106) and may update the PRL to reflect changes to network 108 (e.g., changes to cellular towers) and/or roaming agreements.

M2M device 101 should be configured to provide one or more interfaces through which PRL module 408 may get an activation status for the device, activate the device, perform a PRL update, and/or retrieve current PRL information (e.g., PRL version).

Configuration module 410 may be configured to perform a configuration process to configure M2M device 101. After M2M device 101 is discovered as described above, configuration module 410 may download data representative of a device configuration (e.g., a sensor configuration) from M2M platform subsystem 106 (e.g., from a configuration platform service provided by M2M platform subsystem 106). The device configuration may include information configured to be used by application 202 to determine what operations to perform and when to perform the operations. For example, the device configuration may specify what customer assets to monitor, when to take readings of customer assets, when to send the readings to M2M platform subsystem 106, how to identify an occurrence of a predefined exceptional event, and/or what operations to perform in response to the occurrence of the predefined exceptional event.

In certain examples, a device configuration may include configuration elements such as KVPs, data elements, schedules, schedule groups, threshold structures, plug-ins, or any combination or sub-combination thereof. Each of these items will now be described.

KVPs may include standard KVPs that may be used to control behavior of M2M device 101 and/or customer-defined KVPs that may be used as may suit application 202. For example, standard KVPs may be defined to enable or disable an "always on" parameter associated with connection module 416 and/or to set a linger time parameter used by connection module 416 as described herein. Customer-defined KVPs may be defined to set parameters used by customer assets 104, such as to set a rate schedule for connected wireless parking meters, to set an internal parameter of application 202, and/or as may otherwise suit a customer.

Examples of standard KVPs include, without limitation, an M2M transport protocol host name lookup interval for an M2M transport protocol server IP address, a retry interval specifying how long to wait between message transmission retries (e.g., a retry may be attempted if an acknowledgement message is not received after the retry interval), a retry count specifying a number of retry attempts to perform at the specified retry interval, a configuration check interval specifying a length of time between configuration checks, a data connection parameter (e.g., an "always on" parameter), a data connection linger time specifying a length of time that a data connection with M2M platform subsystem 106 remains connected after the last data transmission on the data connection, a device configuration identifier (e.g., a name of a configuration file), a device configuration version identifier, a size of a queue (e.g., number of items) to be used for readings, events, and errors, a size of a device performance service event queue (e.g., number of items), and a time interval between sending of device performance service events to M2M platform subsystem 106.

Data elements may define internal and/or external inputs and/or outputs to be monitored and/or controlled. Data elements may also define how and when to perform sensor readings and/or writings. A data element may be used to hold a value from a sensor reading and/or a value to be used to write a control parameter (e.g., to a sensor or other customer asset 104).

Schedules may specify when operations are to be performed. A fixed point type schedule may define a point in time when operations are to be performed. A window type schedule may define a window of time within which operations may be performed one or more times. Schedules may be activated and deactivated. In certain examples, schedules may specify how often readings are to be collected from customer assets 104 and/or how often to send the readings to M2M platform subsystem 106.

Schedule groups may contain lists of schedules organized to define a more complex scheduling scenario than would be possible with individual schedules alone. A schedule group may be activated when a schedule included within the schedule group is activated. Schedule groups may be accessed by one or more data elements.

Threshold structures may define criteria for exception events and data to be returned or actions to be taken when exceptional events occur. Threshold structures may be accessed by one or more data elements. When a value of a data element that references a threshold structure satisfies the criteria defined by the threshold structure, an event message may be generated and sent to M2M platform subsystem 106. Accumulated readings data may also be sent to M2M platform subsystem 106 in conjunction with the event message (e.g., immediately following the event message). For example, when an event occurs, one or more schedule groups may be triggered to cause readings to be collected that represent the current state of M2M device 101. Further, when a value of the data element that references a threshold structure satisfies the criteria defined by the threshold structure, an action may be taken. For example, a valve may be opened, an HVAC system may be turned off, an ignition cut-off may be enabled, or another action may be taken.

Plug-ins may include binary executables that may be downloaded to M2M device 101 as part of a configuration. Plug-ins may provide capabilities to interface with input and/or output protocols not otherwise supported by the M2M device 101. Plug-ins may also be used to extend the functionality of application 202 or to solve application-specific problems. For example, a plug-in may be downloaded to M2M device 101 that is configured to adapt M2M device 101 to an applicable scenario and/or input/output device, or to upgrade application 204. In some examples, download of a plug-in to M2M device 101 does not require validation of M2M device 101.

Configuration module 410 may be configured to modify a sensor configuration of M2M device 101 at any time by performing a configuration process (e.g., a configuration update). In addition, configuration module 410 may be configured to check the current sensor configuration of M2M device 101 by sending a configuration check message to M2M platform subsystem 106. The configuration check message may include a cyclic redundancy check ("CRC") value for each component of the sensor configuration. M2M platform subsystem 106 may check these values against information maintained by M2M platform subsystem 106. If any of the values do not match the information maintained by M2M platform subsystem 106, M2M platform subsystem 106 may determine that the associated components of the sensor configuration at M2M device 101 are outdated and may download up-to-date versions of the components of the sensor configuration to M2M device 101.

Data delivery module 412 may be configured to perform one or more operations to allow application 202 to send data representative of readings (e.g., sensor readings), events, and/or errors to one or more platform services provided by M2M platform subsystem 106. Such data may be sent on demand and/or in accordance with a device configuration (e.g., a readings and/or send schedule defined by the configuration). For example, data delivery module 412 may be configured to operate in a particular data delivery mode that is currently enabled by a device configuration. The data delivery modes may provide various levels of data persistence and/or reporting (e.g., various levels of how long collected data remains stored and/or is how often collected data is sent to M2M platform subsystem 106). The data delivery modes may be defined as may suit a particular implementation.

Data delivery module 412 may be configured to provide application 202 with a result of a transmission of data to M2M platform subsystem 106. The result may represent a result of the transmission at an M2M transport protocol messaging layer. This may help to ensure reliability of messaging from M2M device client 102 to M2M platform subsystem 106.

Data delivery module 412 may be configured to save pending messages in a queue to non-volatile memory in accordance with a persistence level of a data delivery mode. This may allow messages to be recovered after a restart of M2M device client 102.

Data delivery module 412 may be configured to queue messages when a connection with M2M platform subsystem 106 is unavailable. The size of the queue (e.g., maximum number of entries) may be defined by a device configuration. When the queue is full, new messages may replace old messages.

Device control module 414 may be configured to receive a device control message from M2M platform subsystem 106 and to send a message to M2M device 101 (e.g., to application 202) to direct the M2M device 101 to perform one or more operations specified by the device control message.

Certain control messages may be independent of a device configuration (e.g., a sensor configuration). Examples of such control messages include, without limitation, a DCF restart message, a device wakeup message, a modem diagnostics message that requests that M2M device 102 build a modem diagnostics message and send it to M2M platform subsystem 106, a PRL update message, a message that requests that M2M device 102 immediately send all queued readings (instead of waiting until the next send schedule), a kill session message that terminates a current connection (e.g., a point-to-point ("PPP") session) and leaves the connection closed for a specified length of time or until an IP or SMS wakeup message is received, a reboot message (e.g., a warm DCF restart or device reboot message in which queued messages are saved on DCF shutdown and recovered on DCF startup and/or a cold DCF restart or device reboot message in which queued messages are discarded on DCF shutdown), a diagnostics or debug request message, a device status message, a PRL update message, and a get error message.

Certain other control messages may be dependent on a device configuration (e.g., a sensor configuration). Such messages may be able to reference the device configuration. For example, such a message may instruct M2M device 101 (e.g., application 202) to send a particular value through a configured register address of a defined data element of the device configuration. Examples of such control messages include, without limitation, a message that requests a current value of a data element and any control message that references a data element of a device configuration. Such control messages may be referred to as "control point" messages. To illustrate examples of control point messages, a control point message may instruct application 202 to open a valve, change a thermostat setting, or otherwise affect a desired change to M2M device 101 and/or customer assets 104.

Connection module 416 may be configured to establish, terminate, and/or otherwise maintain a data connection that has been established between M2M device 101 and M2M platform subsystem 106. The connection may be maintained in accordance with a connection mode. For example, when the connection setting is enabled, the data connection may be maintained as "always on" and remain connected even when no data is sent. When the connection setting is disabled, the data connection may be maintained and remain connected for a predefined length of time ("linger time") after a last data transmission. The connection setting and the linger time may be set by a configuration of M2M device 101. Connection module 416 may be configured to get and report information about a connection (e.g., connection state information) to application 202. M2M device 101 should be configured to provide interfaces through which connection module 416 may open a PPP data connection, close a PPP data connection, and check the status of a PPP data connection.

Performance module 418 may be configured to monitor one or more parameters related to the performance of M2M device 101 (including a modem of M2M device 101). Performance module 418 may be configured to detect a predefined event (e.g., certain network conditions such as PPP connects and disconnects, call ends, registration failures, roaming failures, etc.) and report the event to M2M platform subsystem 106 (e.g., as a message that includes a name value pair ("NVP") string containing parameters and/or attributes useful to a device performance service of M2M platform subsystem 106 to interpret the event). Performance module 418 may define the message in any suitable format, such as a predefined diagnostics data format.

In certain implementations, performance module 418 may be configured to generate and send a diagnostics summary message that contains all of the parameters and/or attributes monitored by performance module 418. In certain examples, the diagnostics summary message may be requested remotely using a device control message sent from M2M platform subsystem 106 to M2M device 101.

Performance module 418 may be configured to send messages for detected events to M2M platform subsystem 106 as soon as the events are detected and a connection is available, in accordance with a send schedule specified by a device configuration, or as instructed by application 202. To this end, performance module 418 may be configured to operate in one of an immediate send mode (in which performance data is sent to M2M platform subsystem 106 as soon as the data is collected and a connection is available), a scheduled send mode (in which performance data is sent to M2M platform subsystem 106 in accordance with a defined send schedule), and a manual send mode (in which performance data is sent to M2M platform subsystem 106 in response to a request from application 202 or M2M platform subsystem 106).

M2M device 101 should be configured to provide interfaces through which performance module 418 may retrieve modem information (e.g., modem received signal strength indication ("RSSI")) and a diagnostic summary message.

Wakeup module 420 may be configured to perform one or more operations related to waking up M2M device 101 in response to a wakeup message from a remote source. For example, wakeup module 420 may receive an IP or SMS wakeup message and respond by directing connection module 416 to establish a connection with M2M platform subsystem 106 and directing configuration module 410 to send a configuration check message to M2M platform subsystem 106. An IP wakeup message may be used when a TCP/IP server socket is maintained on a port and/or when a PPP connection is open. An SMS wakeup message may be useful when such a socket or connection is not available. A wakeup message may include payload defined in any suitable format, which may be used for validating the source of the wakeup request. Wakeup module 420 may maintain a count of wakeup messages received, for each type of wakeup message, beginning when DCF 302 starts (and resetting when DCF 302 restarts).

As mentioned, DCF 302 may be configured to provide an interface through which application 202 and one or more service modules of DCF 302 may interact. The interface may comprise a set of APIs configured to be used by application 202 to access functionality and notifications provided by DCF 302, which allows application 202 to access platform services provided by M2M platform subsystem 106.

Figure 5:
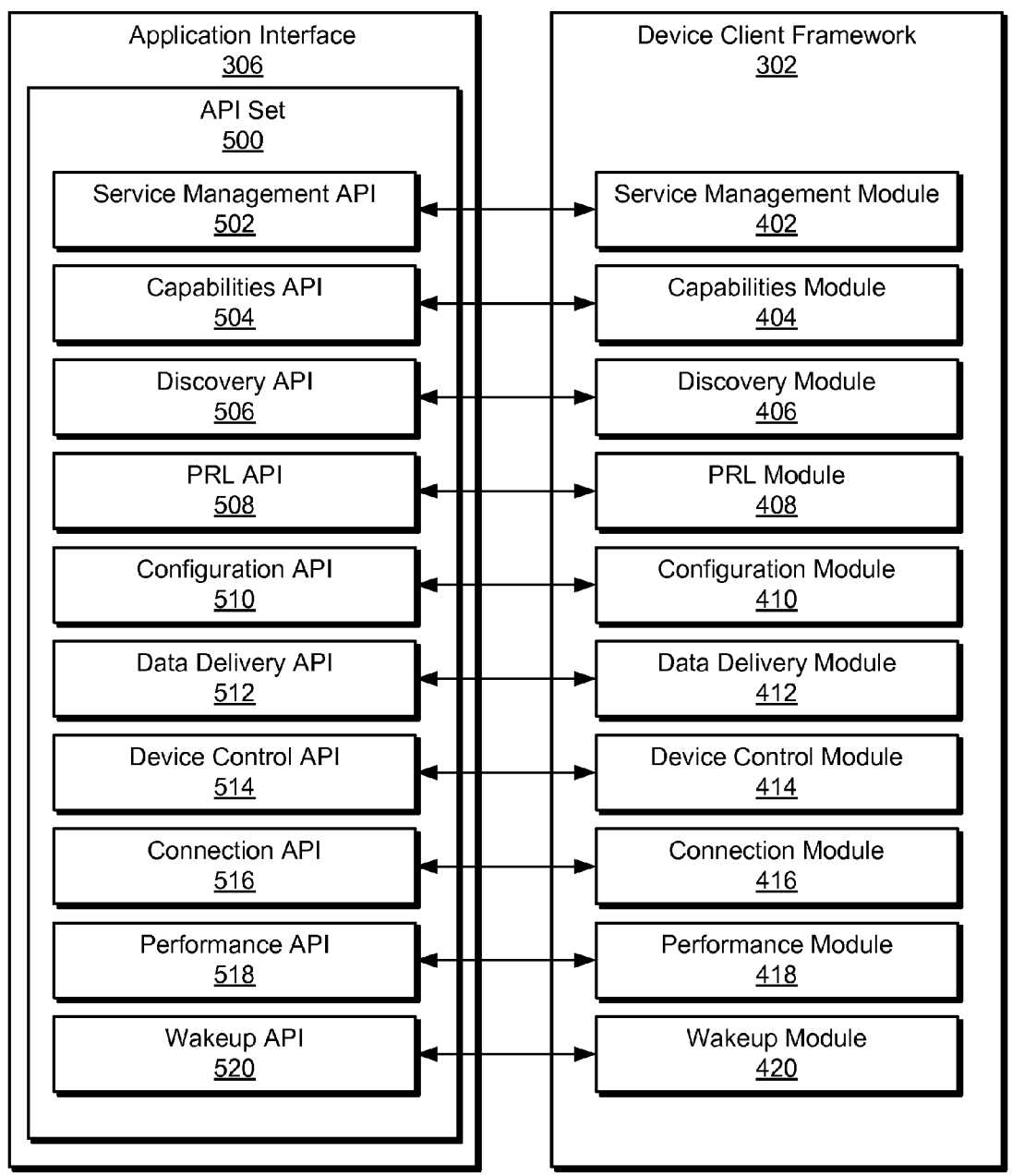
FIG. 5 illustrates an exemplary set of application program interfaces provided by the device client framework of FIG. 4 according to principles disclosed herein.

In certain examples, DCF 302 may expose an API for each service module, which API may include a set of one or more calls that may be called by application 202 and/or used by DCF 302 to provide notifications to application 202. To illustrate, FIG. 5 shows application interface 306 to include a set 500 of APIs corresponding to the exemplary set of service modules of DCF 302 illustrated in FIG. 4. As shown, the set 500 of APIs may include a service management API 502, a capabilities API 504, a discovery API 506, a PRL API 508, a configuration API 510, a data delivery API 512, a device control API 514, a connection API 516, a performance API 518, and a wakeup API 520.

The particular set 500 of APIs shown in FIG. 5 is illustrative only. Other implementations may include alternative sets of DCF APIs. For example, one or more of the DCF APIs shown in FIG. 5 may be omitted from other implementations. For example, connection API 516 may be omitted. In such an example, application 202 may interface with service management module 402 by way of service management API 502, and service management module 402 may interface with connection module 416 to control and/or to get information about a connection between M2M device 101 and M2M platform subsystem 106.

Each API in the set 500 of APIs may include a set of calls (e.g., function calls and callbacks). Examples of such sets of calls for each of the APIs shown in FIG. 5 will now be described. The exemplary sets of calls described are illustrative only. Other implementations may include alternative sets of calls.

Figure 6:
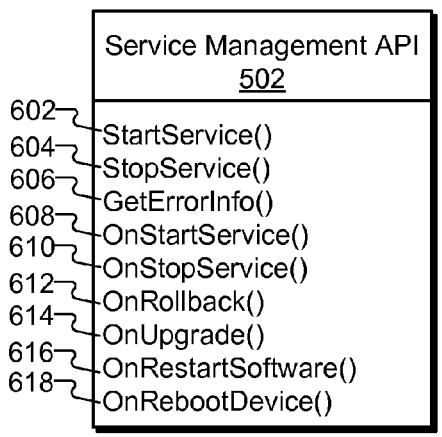
FIGS. 6-15 illustrate exemplary application program interfaces that may be included in the set of application program interfaces provided by the device client framework of FIG. 4 according to principles disclosed herein.

FIG. 6 illustrates an exemplary set of calls that may be included in service management API 502. As shown, the set of calls may include a start-service call 602 configured to be called by application 202 to request a start of an overall service provided by M2M device client 102, a stop-service call 604 configured to be called by application 202 to request a stop of the overall service provided by the M2M device client 102, a get-error-information call 606 configured to be called by application 202 to request error information from the M2M device client 102, a start-service 608 callback configured to notify application 202 that the overall service provided by the M2M device client 102 has been started, a stop-service callback 610 configured to notify application 202 that the overall service provided by the M2M device client 102 has been stopped, a rollback callback 612 configured to notify application 202 that a request to roll back from operating in an application mode to operating in a discovery mode has been received by the M2M device client 102, an upgrade callback 614 configured to notify application 202 that a request to upgrade DCF 302 (e.g., a software upgrade to DCF 302) has been received by the M2M device client 102, a restart callback 616 configured to notify application 202 that a request to restart the M2M device client 102 has been received by the M2M device client 102, and a reboot callback 618 configured to notify application 202 that a request to reboot the M2M device 101 has been received by the M2M device client 102. Application 202 may be configured to issue calls 602-606 to DCF 302, receive callbacks 608-618 from DCF 302, and perform one or more application operations based on the calls 602-606 and/or callbacks 608-618, such as described herein.

Figure 7:
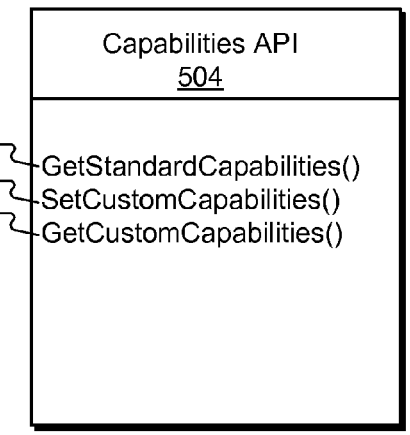

FIG. 7 illustrates an exemplary set of calls that may be included in capabilities API 504. As shown, the set of calls may include a get-standard-capabilities call 702 configured to be called by application 202 to request a set of standard capabilities supported by the M2M device 101, a get-custom-capabilities call 704 configured to be called by application 202 to request a set of custom capabilities supported by the M2M device 101, and a set-device-capabilities call 706 configured to be called by application 202 to set the custom capabilities of the M2M device 101. Application 202 may be configured to issue calls 702-706 to DCF 302 and perform one or more application operations based on the calls 702-706, such as described herein.

Figure 8:
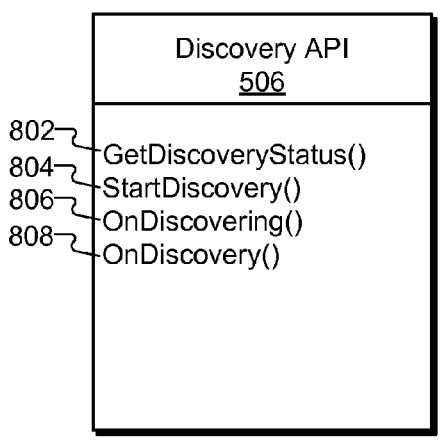

FIG. 8 illustrates an exemplary set of calls that may be included in discovery API 506. As shown, the set of calls may include a discovery-status call 802 configured to be called by application 202 to request a current discovery state of the M2M device 101 with the M2M platform subsystem 106, a start-discovery-call 804 configured to be called by application 202 to initiate a discovery process to facilitate a discovery of the M2M device 101 by the M2M platform subsystem 106, a discovery-in-progress callback 806 configured to notify application 202 that the discovery process is in progress, and a discovery-completed callback 808 configured to notify application 202 that the discovery process is complete. Application 202 may be configured to issue calls 802-804 to DCF 302, receive callbacks 806-808 from DCF 302, and perform one or more application operations based on the calls 802-804 and/or callbacks 806-808, such as described herein.

Figure 9:
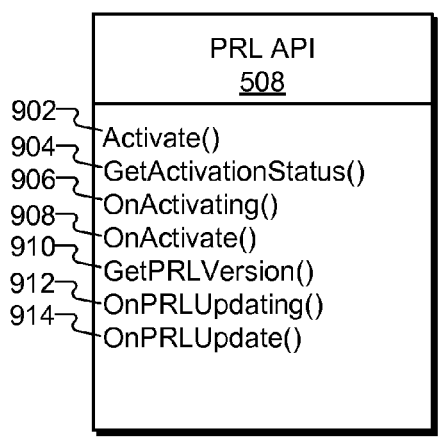

FIG. 9 illustrates an exemplary set of calls that may be included in PRL API 508. The set of calls in the PRL API 508 may include calls associated with activation of M2M device 101 and calls associated with an update of the PRL. As shown, the set of calls may include an activate call 902 configured to be called by application 202 to request an activation of M2M device 101 for service on network 108 (e.g., which activation may include or be followed by a downloading of the most recent PRL to M2M device 101), a get-activation-status call 904 configured to be called by application 202 to request an indication of an activation status of M2M device 101, an activation-in-progress callback 906 configured to notify application 202 that the activation of M2M device 101 is in progress, an activation-completed callback 908 configured to notify application 202 that the activation of M2M device 101 is complete, a get-PRL-version call 910 configured to be called by application 202 to request an indication of a PRL version currently in use by M2M device 101, an update-in-progress callback 912 configured to notify application 202 that an updating of the PRL is in progress, and an update-result callback 914 configured to notify application 202 of a result of the updating of the PRL. Application 202 may be configured to issue calls 902, 904, and 910 to DCF 302, receive callbacks 906-908 and 912-914 from DCF 302, and perform one or more application operations based on the calls 902, 904, and 910 and/or callbacks 906-908 and 912-914, such as described herein. In certain alternative implementations, calls and/or callbacks associated with activation may be omitted from PRL API 508. For example, activation may be performed automatically by DCF 302, and PRL API 508 may not include any calls or callbacks associated with the activation. For instances, any one of calls 902 and 904 or callbacks 906 and 908 may be omitted from PRL API 508.

Figure 10:
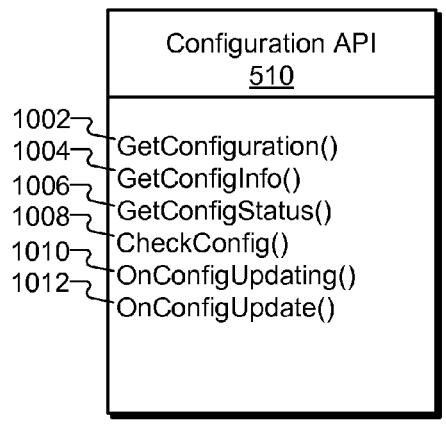

FIG. 10 illustrates an exemplary set of calls that may be included in configuration API 510. As shown, the set of calls may include a get-configuration call 1002 configured to be called by application 202 to request a configuration, (in certain alternative implementations, call 1002 may be divided into two separate calls—a get-first-configuration-item call configured to called by application 202 to request a first item of a specified configuration element and a get-next-configuration-item call configured to be called by application 202 to request a next item of the specified configuration element), a get-configuration-information call 1004 configured to be called by application 202 to request information for a sensor configuration, a get-configuration-status call 1006 configured to be called by application 202 to request a status of a configuration process, a check-configuration call 1008 configured to be called by application 202 to verify that a current configuration used by the M2M device 101 is up to date, a configuration-updating callback 1010 configured to notify application 202 that a configuration update is in progress, and a configuration-completed callback 1012 configured to notify application 202 that the configuration update is complete. Application 202 may be configured to issue calls 1002-1008 to DCF 302, receive callbacks 1010-1012 from DCF 302, and perform one or more application operations based on the calls 1002-1008 and/or callbacks 1010-1012, such as described herein.

Figure 11:
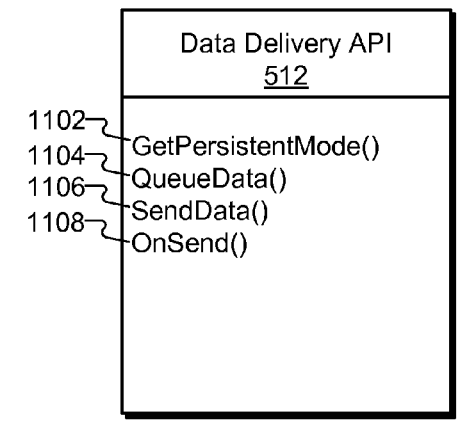

FIG. 11 illustrates an exemplary set of calls that may be included in data delivery API 512. As shown, the set of calls may include a get-persistent-mode call 1102 configured to be called by application 202 to request an indication of a data delivery mode currently enabled by the M2M device 101, a queue-data call 1104 configured to be called by application 202 to request that data representative of at least one of a device reading, a device event, and a device error be queued for transmission to the M2M platform subsystem 106, a send-data call 1106 configured to be called by application 202 to request that queued data representative of at least one of the device reading, the device event, and the device error be transmitted to the M2M platform subsystem 106, and a send-data callback 1108 configured to notify application 202 that the transmitted data has been received by an M2M transport protocol messaging layer of platform messaging interface 304. Application 202 may be configured to issue calls 1102-1106 to DCF 302, receive callback 1108 from DCF 302, and perform one or more application operations based on the calls 1102-1106 and/or callback 1108, such as described herein.

Figure 12:
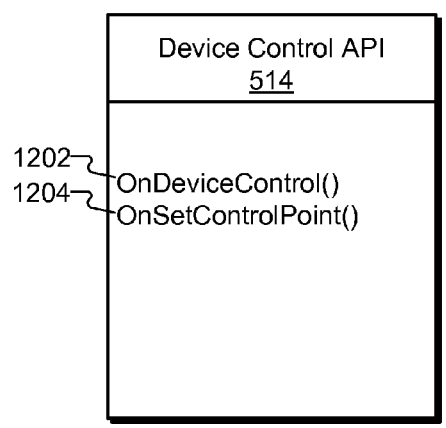

FIG. 12 illustrates an exemplary set of calls that may be included in device control API 514. As shown, the set of calls may include a device-control-request callback 1202 configured to notify application 202 that a device control request has been received from the M2M platform subsystem 106 and a set-control-point-request callback 1204 configured to notify application 202 that a control point request has been received from the M2M platform subsystem 106. Application 202 may be configured to receive callbacks 1202-1204 from DCF 302 and perform one or more application operations based on callback 1202-1204.

Figure 13:
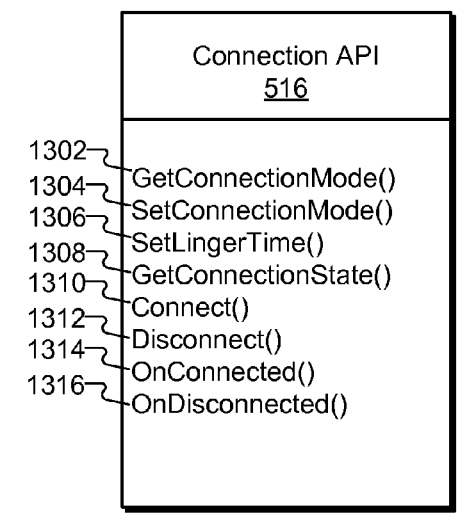

FIG. 13 illustrates an exemplary set of calls that may be included in connection API 516. As shown, the set of calls may include a get-connection-mode call 1302 configured to be called by application 202 to request an indication of a connection mode currently in use by the M2M device client 102, a set-mode call 1304 configured to be called by application 202 to set the connection mode to one of an always-on mode and a linger mode, a set-linger-time call 1306 configured to be called by application 202 to set a linger time to a specified length of time, a get-connection-state call 1308 configured to be called by application 202 to request an indication of a connection state, a connect call 1210 configured to be called by application 202 to request that a connection be established with the M2M platform subsystem 106, a disconnect call 1212 configured to be called by the application to request that an established connection with the M2M platform subsystem 106 be disconnected, a connect callback 1214 configured to notify application 202 that a connection has been established, and a disconnect callback 1216 configured to notify application 202 that a connection has been disconnected. Application 202 may be configured to issue calls 1202-1212 to DCF 302, receive callbacks 1214-1216 from DCF 302, and perform one or more application operations based on the calls 1202-1212 and/or callbacks 1214-1216, such as described herein. In certain alternative embodiments, connection API 510 may be omitted from the set 500 of APIs, as described herein.

Figure 14:
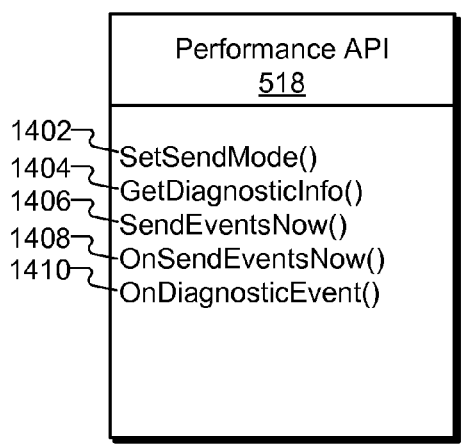
Figure 15:
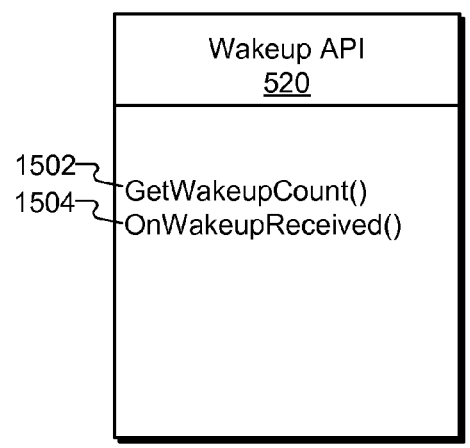

FIG. 14 illustrates an exemplary set of calls that may be included in performance API 518. As shown, the set of calls may include a set-send-mode call 1402 configured to be called by application 202 to request that a device performance data send mode be set to one of an immediate send mode, a scheduled send mode, and a manual send mode, a get-diagnostics-information call 1404 configured to be called by application 202 to request a diagnostic summary message, a send-event-now call 1406 configured to be called by application 202 to request that all queued device performance data be sent to the M2M platform subsystem 106, a send-event-now callback 1408 configured to notify application 202 of a result of the send-event-now call, and a diagnostic-event callback 1410 configured to notify application 202 when a device performance event is generated. Application 202 may be configured to issue calls 1402-1406 to DCF 302, receive callbacks 1408-1410 from DCF 302, and perform one or more application operations based on the calls 1402-1406 and/or callbacks 1408-1410, such as described herein. In certain alternative implementations, the send-event-now call 1406 and the send-event-now callback 1408 may be replaced with a queue-event call configured to be called by application 202 to request that device performance data for an event be queued for transmission to the M2M platform subsystem 106, a send-event call configured to be called by application 202 to request that queued device performance data for an event be sent to the M2M platform subsystem 106, and a send-event callback configured to notify application 202 of a result of the send-event call, FIG. 15 illustrates an exemplary set of calls that may be included in wakeup API 520. As shown, the set of calls may include a get-wakeup-count call 1502 configured to be called by application 202 to request a count of a specified type of device wakeup (e.g., an IP or SMS type of wakeup) and a wakeup-received callback 1504 configured to notify application 202 that a wakeup message has been received by the M2M device client 102. Application 202 may be configured to issue call 1502 to DCF 302, receive callback 1504 from DCF 302, and perform one or more application operations based on the call 1502 and/or callback 1504, such as described herein.

Returning to FIG. 3, platform messaging interface may comprise an interface between DCF 302 and M2M platform subsystem 106. The interface may allow M2M device client 102 to communicate with M2M platform subsystem 106 and/or any platform services provided by M2M platform subsystem 106 in any of the ways described herein. Accordingly, M2M device client 102 may provide messages to and receive messages from M2M platform subsystem 106 by way of platform messaging interface 304.

Figure 16:
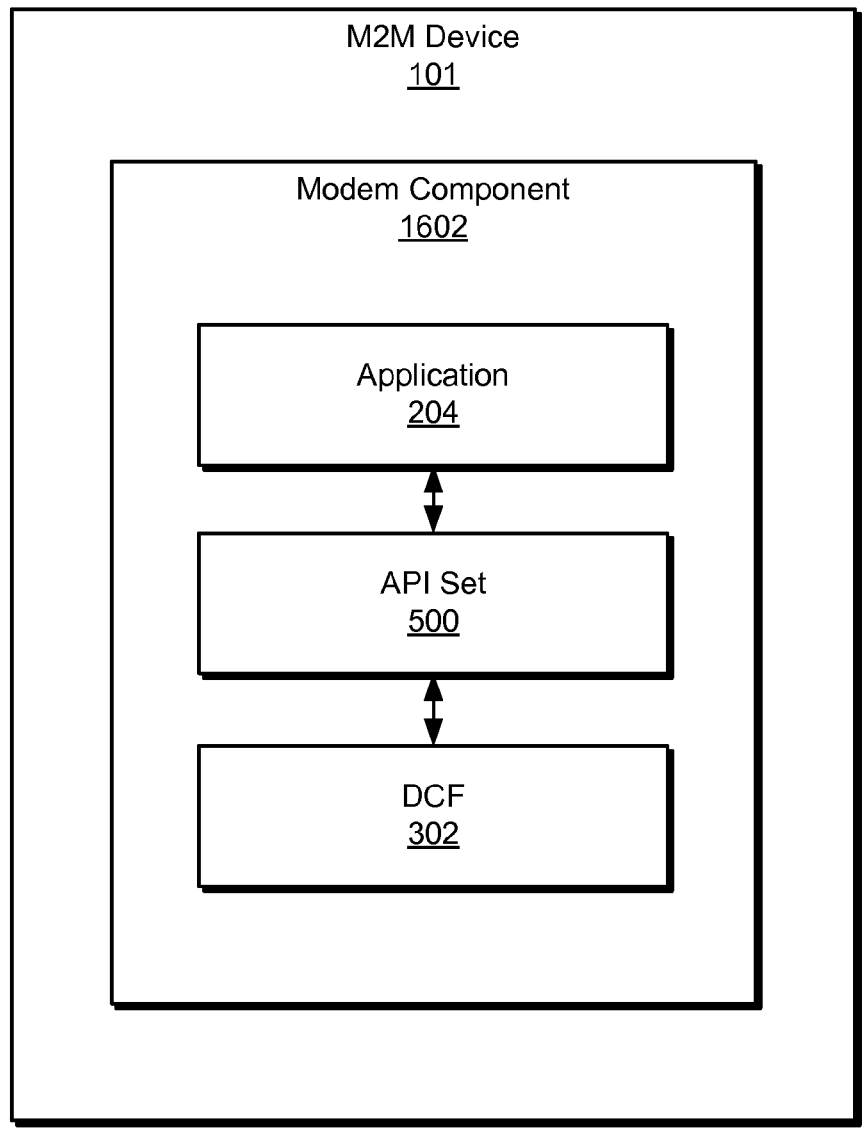
FIGS. 16-18 illustrate exemplary implementations according to principles disclosed herein.
Figure 17:
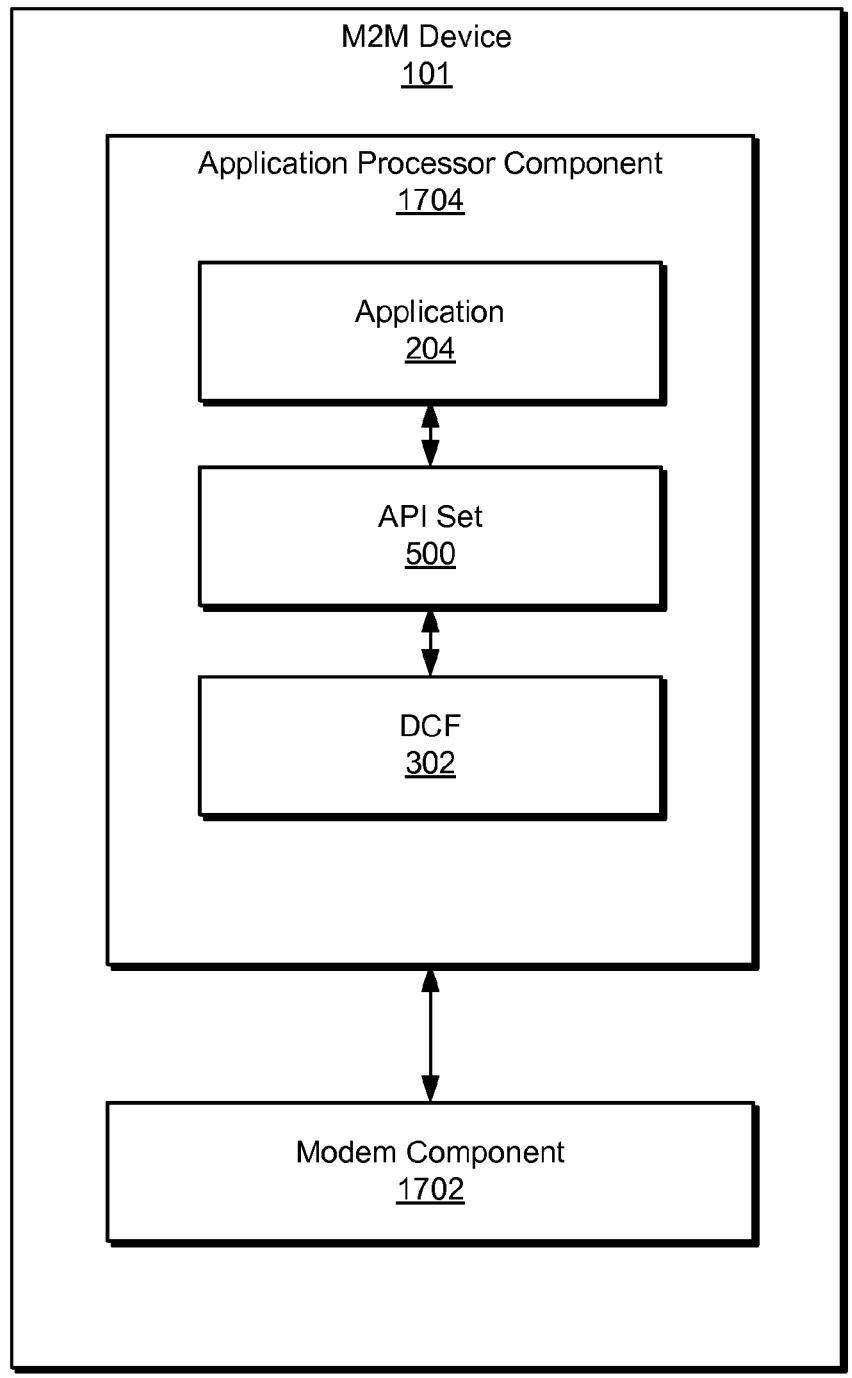
Figure 18:
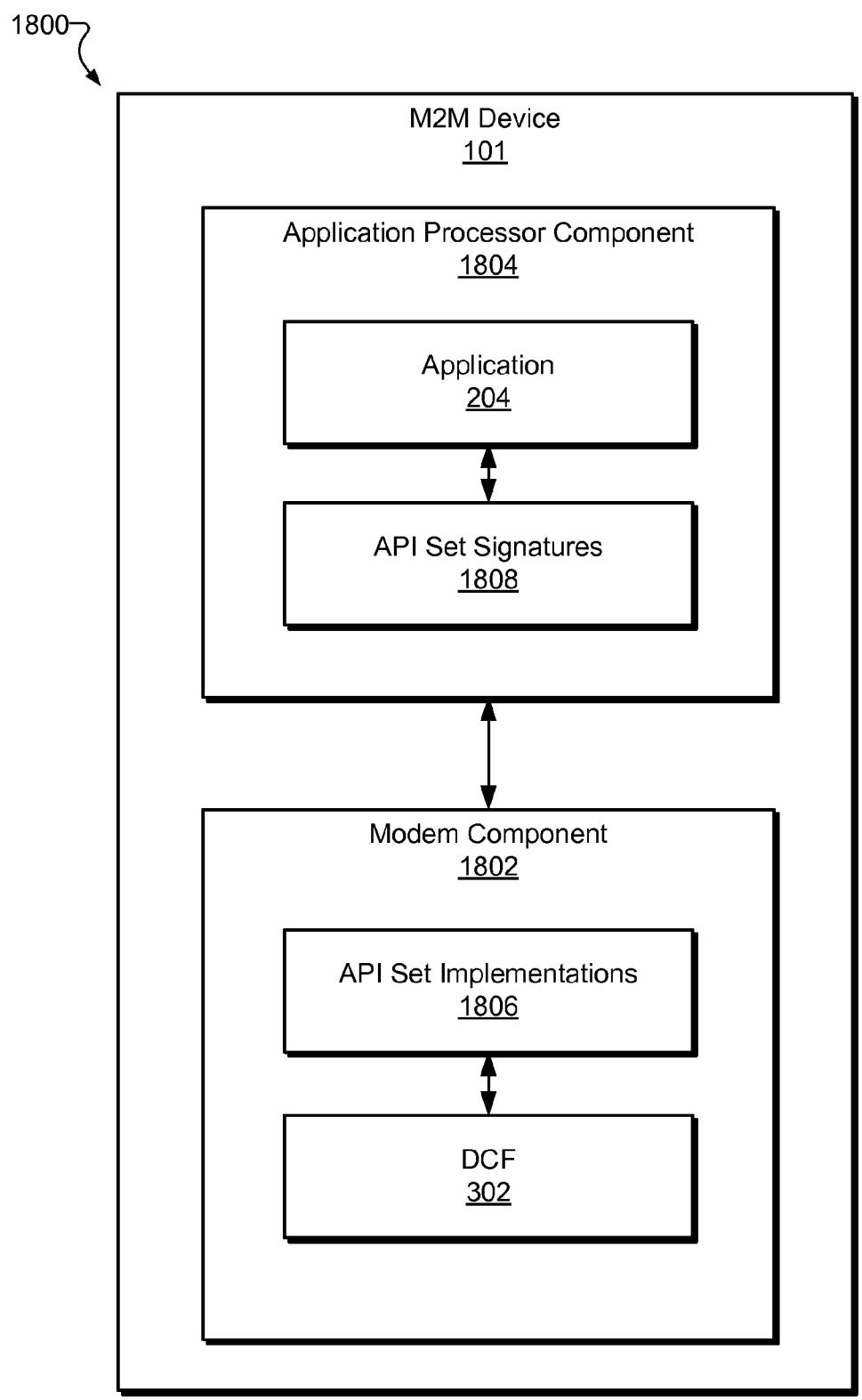

One or more of the elements described above may be implemented in various ways by M2M device 101. For example, DCF 302, API set 500, and/or application 204 may be implemented by M2M device 101 in various implementations with respect to other components of M2M device 101, particularly with respect to a modem component and/or a processor component of M2M device 101. As used herein, a "modem" component may refer to a modem for connecting to a wireless and/or a wired network (e.g., network 108). The modem component and the process components described herein may be separate physical and/or logical structures within M2M device 101. FIGS. 16-18 illustrate various implementations 1600-1800 of DCF 302, API set 500, and/or application 204 by M2M device 101.

In implementation 1600 shown in FIG. 16, M2M device 101 includes a modem component 1602 in which DCF 302, API set 500, and application 204 are all implemented. In implementation 1700 shown in FIG. 17, M2M device 101 includes a modem component 1702 communicatively coupled to an application processor component 1704. As shown, DCF 302, API set 500, and application 204 are all implemented within application processor component 1704. In implementation 1800 shown in FIG. 18, M2M device 101 includes a modem component 1802 communicatively coupled to an application processor component 1804. As shown, the modem component 1802 may implement DCF 302 and API set implementations 1806, which may comprise implementations of API set 500. In addition, application processor component 1804 may implement application 204 and API set signatures 1808, which may comprise signatures of API set 500.

In certain implementations, one or more of the APIs described herein may be exposed by DCF 302 over remote procedure call ("RPC") communications technologies. This may allow physically or logically separate devices, device components, and application processors to call the DCF APIs. For example, DCF 302 may expose and application 204 may use RPC to call APIs included in API set 500 in implementation 1800 shown in FIG. 18. Exposure of the APIs over RPC may be used for testing, validation, or any other suitable purpose.

An implementation such as implementation 1800 may provide one or more benefits, such as cost savings for physical cabling within M2M device 101. For example, implantation 1800 may allow some antenna cables required to be used in other implementations to be replaced with less expensive USB cables. For instance, modem component 1802 and application processor component 1804 may be connected with USB cable.

An additional or alternative benefit may be improved memory usage. For example, application processor component 1804 may be implemented by a microcontroller having limited memory resources. DCF 302 and its operations and/or APIs may be implemented by modem component 1802 to free up memory resources of the microcontroller for use by application 204.

Figure 19:
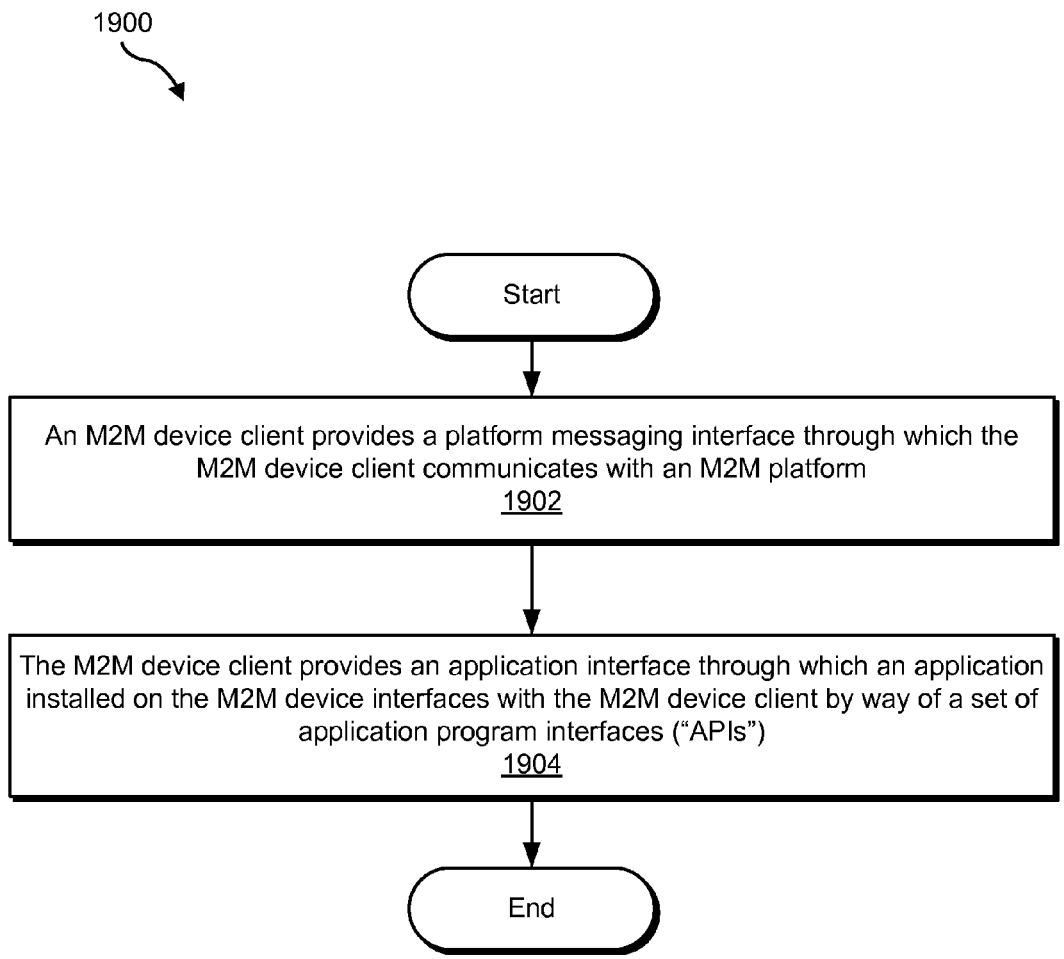
FIG. 19 illustrates an exemplary M2M device client method according to principles disclosed herein.

FIG. 19 illustrates an exemplary M2M device client method 1900. While FIG. 19 illustrates exemplary steps according to one embodiment, other embodiments may omit, add to, reorder, combine, and/or modify any of the steps shown in FIG. 19. In certain examples, one or more of the steps shown in FIG. 19 may be performed by an M2M device client (e.g., M2M device client 102) and/or any implementation thereof.

In step 1902, an M2M device client provides platform messaging interface through which the M2M device client communicates with an M2M platform. For example, DCF 302 of M2M device client 102 implemented by M2M device 101 may provide platform messaging interface 304, which may support communications between M2M device client 102 and M2M platform subsystem 106 in any suitable way, including in any of the ways described herein.

In step 1904, the M2M device client provides an application interface through which an application installed on the M2M device interfaces with the M2M device client by way of a set of APIs. For example, DCF 302 of M2M device client 102 implemented by M2M device 101 may provide application interface 306, which may include any of the APIs described herein in any suitable configuration.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 20:
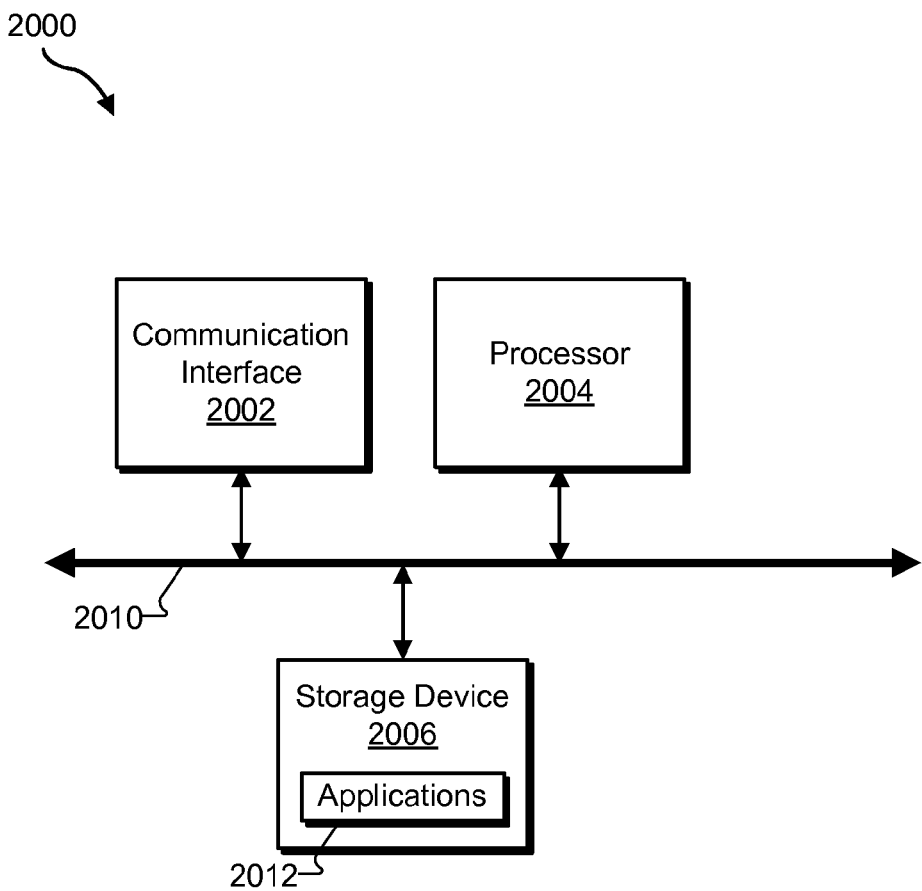
FIG. 20 illustrates an exemplary computing device according to principles described herein.

FIG. 20 illustrates an exemplary computing device 2000 that may be configured to perform one or more of the processes described herein. As shown in FIG. 20, computing device 2000 may include a communication interface 2002, a processor 2004, and a storage device 2006, communicatively connected via a communication infrastructure 2010. While an exemplary computing device 2000 is shown in FIG. 20, the components illustrated in FIG. 20 are not intended to be limiting. Additional or alternative components may be used in other embodiments. Components of computing device 2000 shown in FIG. 20 will now be described in additional detail.

Communication interface 2002 may be configured to communicate with one or more computing devices. Examples of communication interface 2002 include, without limitation, a wired network interface (such as a network interface card), a wireless network interface (such as a wireless network interface card), a modem, an audio/video connection, and any other suitable interface.

Processor 2004 generally represents any type or form of processing unit capable of processing data or interpreting, executing, and/or directing execution of one or more of the instructions, processes, and/or operations described herein. Processor 2004 may execute and/or direct execution of operations as directed by one or more applications 2012 (which may include one or more software applications) or other computer-executable instructions such as may be stored in storage device 2006 or another computer-readable medium.

Storage device 2006 may include one or more data storage media, devices, or configurations and may employ any type, form, and combination of data storage media and/or device. For example, storage device 2006 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 2006. For example, data representative of one or more executable applications 2012 configured to direct processor 2004 to perform any of the operations described herein may be stored within storage device 2006. In some examples, data may be arranged in one or more databases residing within storage device 2006.

In some examples, any of the systems and/or system components described herein may be implemented by or within one or more components of computing device 2000. For example, one or more applications 2012 residing within storage device 2006 may be configured to direct processor 2004 to perform one or more processes or functions associated with M2M system 100, M2M device 101, M2M device client 102, or one or more components of M2M system 100, M2M device 101, and/or M2M device client 102. Additionally or alternatively, data described herein may be stored by storage device 2006.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A machine-to-machine ("M2M") device comprising:
at least one hardware processor;
a sensor that performs at least one of collecting, from a customer asset communicatively connected to the M2M device, a device reading of one or more parameters of the customer asset, detecting a predetermined device event, and detecting a device error;
an application that collects, from the sensor, data representative of at least one of the device reading, the device event, and the device error; and
an M2M device client that directs the at least one hardware processor to:
provides a platform messaging interface through which the M2M device client communicates with an M2M platform subsystem by way of a network, and
provides an application interface that comprises a set of application program interfaces ("APIs") through which the application interfaces with the M2M device client;
wherein the set of APIs comprises:
a discovery API that includes
a start-discovery-call configured to be called by the application to initiate a discovery process to facilitate a discovery of the M2M device by the M2M platform subsystem,
a discovery-in-progress callback configured to notify the application that the discovery process is in progress, and
a discovery-completed callback configured to notify the application that the discovery process is complete;
a configuration API that includes a get configuration call configured to be called by the application to request data representative of a device configuration received from the M2M platform subsystem after the M2M device is discovered to the M2M platform; and
a data delivery API that includes
a queue-data call configured to be called by the application to request that the data representative of the at least one of the device reading, the device event, and the device error be queued for transmission to the M2M platform subsystem,
a send-data call configured to be called by the application in accordance with the device configuration to request that queued data representative of the at least one of the device reading, the device event, and the device error be transmitted to the M2M platform subsystem, and
a send-data callback configured to notify the application that the transmitted data has been received by an M2M transport protocol messaging layer of the platform messaging interface.

2. The M2M device of claim 1, wherein the configuration API further comprises:
a check-configuration call configured to be called by the application to verify whether a current configuration used by the M2M device is up to date,
a configuration-updating callback configured to notify the application that a configuration update is in progress, and
a configuration-completed callback configured to notify the application that the configuration update is complete.

3. The M2M device of claim 2, wherein the configuration API further comprises:
a get-configuration-information call configured to be called by the application to request information for the device configuration, and
a get-configuration-status call configured to be called by the application to request a status of a configuration process.

4. The M2M device of claim 1, wherein the discovery API further comprises a discovery-status call configured to be called by the application to request a current discovery state of the M2M device with the M2M platform subsystem.

5. The M2M device of claim 1, wherein the set of APIs further comprises a capabilities API that includes:
a get-standard-capabilities call configured to be called by the application to request a set of standard capabilities supported by the M2M device,
a get-custom-capabilities call configured to be called by the application to request a set of custom capabilities supported by the M2M device, and
a set-custom-capabilities call configured to be called by the application to set the custom capabilities of the M2M device.

6. The M2M device of claim 1, wherein the set of APIs further comprises a device control API that includes:
a device-control-request callback configured to notify the application that a device control request has been received from the M2M platform subsystem, and
a set-control-point-request callback configured to notify the application that a control point request has been received from the M2M platform subsystem.

7. The M2M device of claim 1, wherein the set of APIs further comprises a service management API that includes:
a start-service call configured to be called by the application to request a start of an overall service provided by the M2M device client,
a stop-service call configured to be called by the application to request a stop of the overall service provided by the M2M device client,
a start-service callback configured to notify the application that the overall service provided by the M2M device client has been started, and
a stop-service callback configured to notify the application that the overall service provided by the M2M device client has been stopped.

8. The M2M device of claim 7, wherein the service management API further includes:
a rollback callback configured to notify the application that a request to roll back from the M2M device client operating in an application mode to the M2M device client operating in a discovery mode has been received by the M2M device client, and
an upgrade callback configured to notify the application that a request to upgrade the M2M device client has been received by the M2M device client.

9. The M2M device of claim 7, wherein the service management API further includes:
a restart callback configured to notify the application that a request to restart the M2M device client has been received by the M2M device client, and
a reboot callback configured to notify the application that a request to reboot the M2M device has been received by the M2M device client.

10. The M2M device of claim 1, wherein the set of APIs further comprises a preferred roaming list ("PRL") API that includes:
an activate call configured to be called by the application to request an activation of the M2M device for service on the network,
a get-activation-status call configured to be called by the application to request an indication of an activation status of the M2M device,
an activation-in-progress callback configured to notify the application that the activation of the M2M device is in progress, and
an activation-completed callback configured to notify the application that the activation of the M2M device is complete.

11. The M2M device of claim 10, wherein the PRL API further includes:
a get-PRL-version call configured to be called by the application to request an indication of a PRL version currently in use by the M2M device,
an update-in-progress callback configured to notify the application that an updating of the PRL is in progress, and
an update-result callback configured to notify the application of a result of the updating of the PRL.

12. The M2M device of claim 1, wherein the set of APIs further comprises a performance API that includes a set-send-mode call configured to be called by the application to request that a device performance data send mode be set to one of an immediate send mode, a scheduled send mode, and a manual send mode.

13. The M2M device of claim 1, wherein the set of APIs further comprises a performance API that includes a get-diagnostics-information call configured to be called by the application to request a diagnostic summary message.

14. The M2M device of claim 1, wherein the set of APIs further comprises a performance API that includes:
a send-event-now call configured to be called by the application to request that all queued device performance data be sent to the M2M platform subsystem, and
a send-event-now callback configured to notify the application of a result of the send-event-now call.

15. The M2M device of claim 1, wherein the set of APIs further comprises a wakeup API that includes a get-wakeup-count call configured to be called by the application to request a count of a specified type of device wakeup that have occurred since a startup of the M2M device client.

16. The M2M device of claim 1, wherein the set of APIs further comprises a wakeup API that includes a wakeup-received callback configured to notify the application that a wakeup message has been received by the M2M device client.

17. The M2M device of claim 1, wherein the set of APIs further comprises a connection API that includes:
a get-connection-mode call configured to be called by the application to request an indication of a connection mode currently in use by the M2M device client,
a set-mode call configured to be called by the application to set the connection mode to one of an always-on mode and a linger mode, and
a set-linger-time call configured to be called by the application to set a linger time to a specified length of time.

18. The M2M device of claim 1, wherein the set of APIs further comprises a connection API that includes:
a connect call configured to be called by the application to request that a connection be established with the M2M platform subsystem,
a disconnect call configured to be called by the application to request that an established connection with the M2M platform subsystem be disconnected,
a connect callback configured to notify the application that the connection has been established, and
a disconnect callback configured to notify the application that the connection has been disconnected.

19. A machine-to-machine ("M2M") device comprising:
at least one hardware processor;
a sensor that performs at least one of collecting, from a customer asset communicatively connected to the M2M device, a device reading of one or more parameters of the customer asset, detecting a predetermined device event, and detecting a device error;
an application installed on the M2M device and that collects, from the sensor, data representative of at least one of the device reading, the device event, and the device error; and
an M2M device client implemented by the M2M device and that includes a device client framework that directs the at least one hardware processor to:
operate in accordance with a discovery mode or an application mode; and
provide a set of application program interfaces ("APIs") through which the application installed on the M2M device interfaces with the M2M device client;
wherein the set of APIs comprises:
a discovery API that includes
a start-discovery-call configured to be called by the application to initiate a discovery process to facilitate a discovery of the M2M device by the M2M platform subsystem,
a discovery-in-progress callback configured to notify the application that the discovery process is in progress, and
a discovery-completed callback configured to notify the application that the discovery process is complete;
a configuration API that includes a get configuration call configured to be called by the application to request data representative of a device configuration received from the M2M platform subsystem after the M2M device is discovered to the M2M platform;
a data delivery API that includes
a queue-data call configured to be called by the application to request that the data representative of the at least one of the device reading, the device event, and the device error be queued for transmission to the M2M platform subsystem,
a send-data call configured to be called by the application in accordance with the device configuration to request that queued data representative of the at least one of the device reading, the device event, and the device error be transmitted to the M2M platform subsystem, and
a send-data callback configured to notify the application that the transmitted data has been received by an M2M transport protocol messaging layer of the platform messaging interface;
a service management API that includes
a rollback callback configured to notify the application that a request to roll back from the device client framework operating in the application mode to the device client framework operating in the discovery mode has been received by the M2M device client, and
an upgrade callback configured to notify the application that a request to upgrade the device client framework has been received by the M2M device client.

20. A method comprising:
providing, by a machine-to-machine ("M2M") device client implemented by an M2M device, a platform messaging interface through which the M2M device client communicates with an M2M platform subsystem by way of a network; and
providing, by the M2M device client, an application interface that includes a set of application program interfaces ("APIs") through which an application installed on the M2M device interfaces with the M2M device client, the application installed on the M2M device configured to collect, from a sensor implemented by the M2M device, data representative of at least one of a device reading, a device event, and a device error;
wherein the set of APIs comprises:
a discovery API that includes
a start-discovery-call configured to be called by the application to initiate a discovery process to facilitate a discovery of the M2M device by the M2M platform subsystem,
a discovery-in-progress callback configured to notify the application that the discovery process is in progress, and
a discovery-completed callback configured to notify the application that the discovery process is complete;
a configuration API that includes a get configuration call configured to be called by the application to request data representative of a device configuration received from the M2M platform subsystem after the M2M device is discovered to the M2M platform; and
a data delivery API that includes
a queue-data call configured to be called by the application to request that the data representative of the least one of the device reading, the device event, and the device error be queued for transmission to the M2M platform subsystem,
a send-data call configured to be called by the application in accordance with the device configuration to request that queued data representative of the at least one of the device reading, the device event, and the device error be transmitted to the M2M platform subsystem, and
a send-data callback configured to notify the application that the transmitted data has been received by an M2M transport protocol messaging layer of the platform messaging interface.

21. The method of claim 20, embodied as computer-executable instructions on at least one non-transitory computer-readable medium.

* * * * *